April 13, 1948.  V. ALEKS  2,439,376
BICYCLE BASKET
Filed Oct. 23, 1942
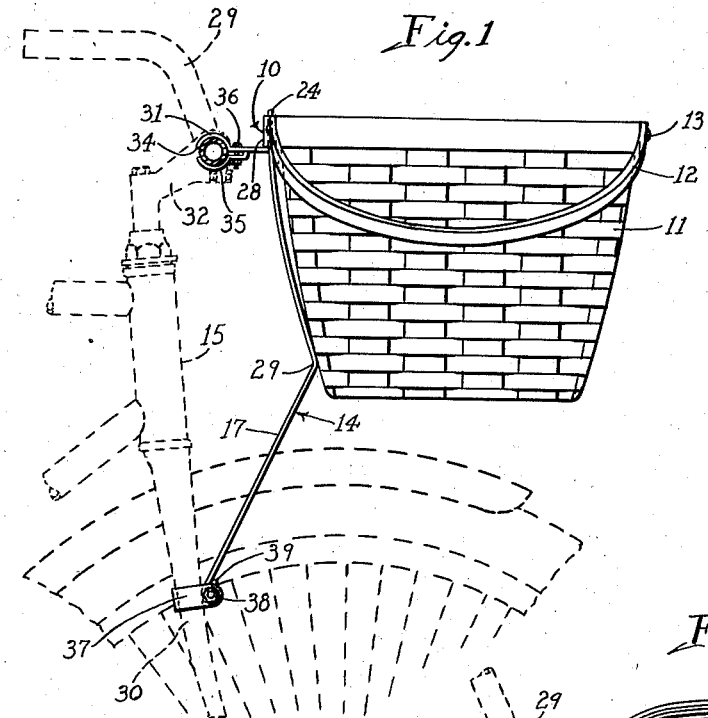
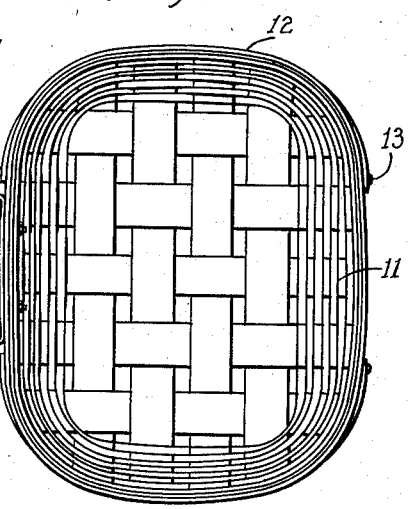
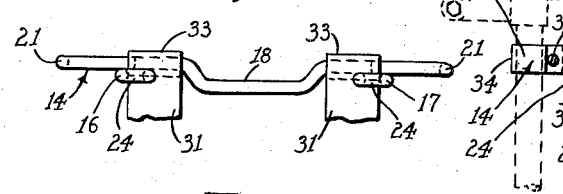
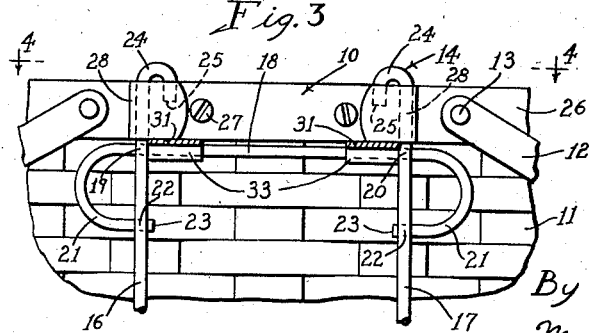
Inventor:
Vytant Aleks
By
McCanna, Wintercorn & Morsbach
Attys.

Patented Apr. 13, 1948

2,439,376

UNITED STATES PATENT OFFICE 2,439,376

BICYCLE BASKET

Vytant Aleks, Rockford, Ill., assignor to The Washburn Company, Worcester, Mass., a corporation of Massachusetts Application October 23, 1942, Serial No. 463,102

5 Claims. (Cl. 224—36)

This invention relates to bicycle baskets, and has for its principal object the provision of a supporting bracket adapted for easy application to different makes and styles of handle bars, together with a basket that is adapted for quick and easy attachment to and removal from the bracket so as to permit use of the basket for shopping purposes besides as a carrier basket for the bicycle.

A salient feature of the present invention lies in the fact that an ordinary wicker or other non-metallic basket equipped with a small slip-on fastener clip of simple and economical sheet metal construction can be applied to a supporting bracket of simple construction thus reducing the use of critical materials to a minimum. However, it should be understood the invention is not limited to the use of a non-metallic basket.

Another feature of the invention consists in the construction of the supporting bracket of wire, which so far as critical materials at the present time are concerned is more plentiful, the bracket being so designed to insure the requisite rigidity and also to avoid exposing any raw ends.

The invention is illustrated in the accompanying drawing, in which—

Figure 1 is a side view of a bicycle basket made in accordance with my invention and indicating in dotted lines the mode of attachment to the bicycle;

Fig. 2 is a top view;

Fig. 3 is a cross-section on an enlarged scale in a vertical plane, taken on the line 3—3 of Fig. 2, and Fig. 4 is a top view of the supporting bracket with the basket removed, taken on the line 4—4 of Fig. 3.

The same reference numerals are applied to corresponding parts throughout the views.

Bicycle baskets are used quite generally for carrying packages, and the bicycle basket of my invention, as stated before, has been designed with a view to easy removal of the basket proper so that it may be used as any ordinary shopping basket, and after the shopping is done is adapted to be replaced on the bicycle easily to serve as a carrier basket. The use of the basket interchangeably in the manner stated has been made practical by reason of the fact that there is only a small and hardly noticeable slip-on fastener clip, indicated generally by the reference numeral 10, provided on the basket 11. The latter is of wicker construction and has foldable handles 12 pivotally mounted thereon, as indicated at 13, which when the basket is supported on the bracket 14 on the bicycle 15 can be folded down out of the way, as illustrated in Fig. 1. The basket when removed from the bracket on the bicycle serves as any ordinary shopping basket, and the clip 10 is not objectionable or noticeable. It is furthermore apparent at the outset to what extent the use of a wicker or other non-metallic basket means a saving in the consumption of critical materials, although, as previously stated, the invention is not to be regarded as limited to the use of a non-metallic basket.

The bracket 14 comprises two upright wire frame members 16 and 17 interconnected near their upper ends by a wire cross-member 18 spot welded at the points of intersection 19 and 20. The opposite ends 21 of the cross-member 18 are bent to U-shape and spot welded to the upright frame members 16 and 17 at the points of intersection 22. In that way the raw ends 23 of the wire extend inwardly toward each other and are not exposed objectionably. The upper end portions 24 of the upright frame members 16 and 17 are bent to inverted U-shape, as illustrated, so that the raw ends 25 project downwardly and will not be exposed objectionably. These end portions 24 form supporting lugs for attachment of the basket 11 to the bracket 14 by means of the sheet metal clip 10. The latter is fastened to the top frame 26 of the basket by bolts 27 and has the opposite ends thereof bent upon themselves, as indicated at 28, to provide sockets therein for snug reception of the lugs 24. The upright frame members 16 and 17 are bent, as indicated at 29, to have engagement with the back of the basket near the bottom thereof when the basket is suspended on the bracket 14 at its upper end by means of the clip 10. In that way the load is well distributed, and there is not too much strain imposed upon the clip 10, nor is there any likelihood of the basket being wobbly and rattling when the bicycle is in motion. There is preferably a tendency for the basket to hug the bracket 14 even when the basket is empty, so that the likelihood of rattling is reduced to a minimum and there is less danger of the clip 10 working off the lugs 24 on the bracket accidentally. The broad U-shaped ends 21 of the cross-member 18 are also adapted to have engagement with the back of the basket below the top frame thereof, as indicated in Fig. 3, and in that way steadier support of the basket on the bracket 14 is assured.

The bracket 14 is adapted to be attached to the bicycle 15 by its upper end on the handle bar 29 and by its lower end on the front fork 30. There are two sheet metal supporting and attaching arms 31 for attachment to the handle bar on opposite sides of the stem 32, and these are bent to provide bearing loops 33 on the front ends for pivotal connection with the cross-member 18 of the bracket 14, as clearly appears in Figs. 3 and 4. The rear ends 34 of these arms are bent to a half-round form to fit on top of the handle bar so that the arms can be clamped to the handle bar in the conventional manner, that is to say, by means of half-round clips 35 adjustably connected to the arms by means of bolts 36. Sheet metal clamps 37 serve to attach the lower ends of the frame members 16 and 17 to the legs of the front fork 30, bolts 38 in these clamps being entered in eyes 39 formed on the lower ends of the frame members 16 and 17. It is obvious that in relation to the whole device the supporting bracket 14 represents a small part, and most of the bracket is made of wire which is not so difficult to obtain in quantities at the present time.

It is believed the foregoing description conveys a good understanding of the objects and advantages of my invention. The appended claims have been drawn to cover all legitimate modifications and adaptations.

I claim:

1. A bicycle basket support, comprising an inverted generally U-shaped wire bracket providing two laterally spaced upright members, a cross-member secured to the upright members spaced downwardly from their upper ends, the upper ends of said upright members above the cross-member being bent inwardly toward each other to define attaching lugs in a substantially vertical plane for connection with a bicycle basket, means connected to the cross-member for detachably securing the bracket to a bicycle handle bar, means connected with the lower ends of the upright members of said bracket for detachably securing the bracket in rigid relation to a bicycle front fork, the bracket itself serving to locate the two fastening means in a predetermined vertically spaced relationship for correct application to a bicycle, and a fastener clip secured on the upper rim portion of a basket and formed to receive the aforesaid attaching lugs for demountably supporting a bicycle basket on said bracket, the cross-member serving to limit downward movement of the fastener clip on said attaching lugs, whereby to support the basket to which the clip is secured.

2. A bicycle basket support as set forth in claim 1, wherein the means for detachably securing the bracket to a bicycle handle bar comprises elements pivotally connected to the end portions of the cross-member in abutment with the adjacent inner sides of the upright members, said cross-member being bent in inwardly spaced relation to said upright members to define shoulders thereon to limit displacement of said pivoted elements laterally away from said upright members.

3. A bicycle basket support as set forth in claim 1, wherein the cross-member has its opposite end portions projecting beyond the upright members and bent generally U-shaped, so that the extreme end portions of said cross-member have abutment with the upright members, said extreme end portions being secured to said upright members to hold the latter in a substantially vertical common plane.

4. A bicycle basket support as set forth in claim 1, wherein the upright members are bent intermediate their ends to a generally V-shape, the apex of the V being below but forwardly spaced in relation to the attaching lugs for abutment with the lower rear portion of a bicycle basket in its attached position.

5. A bicycle basket support, comprising an inverted generally U-shaped bracket providing two laterally spaced upright members, a cross-member secured to the upright members spaced downwardly from their upper ends, the upper end portions of said upright members above the cross-member defining attaching lugs in a substantially vertical plane for connection with a bicycle basket, means connected to the cross-member for detachably fastening the bracket to a bicycle handle-bar, means connected to the lower ends of the upright members for detachably fastening the bracket in rigid relation to the legs of a bicycle front fork, and a fastener clip secured to the upper rear portion of a bicycle basket and formed for detachable engagement on the aforesaid attaching lugs for demountably supporting the basket on the bracket, the cross-member serving to limit downward movement of the fastener clip on said attaching lugs, whereby to support the basket to which the clip is secured, the upright members being both bent forwardly intermediate their ends to V shape, with the apex of the V at a point spaced appreciably below the cross-member, whereby to provide an abutment above and adjacent the apex portion of the V for engagement with the lower rear portion of the bicycle basket in its attached position.

VYTANT ALEKS.

REFERENCES CITED

The following references are of record in the file of this patent:

UNITED STATES PATENTS

| Number | Name | Date |
| --- | --- | --- |
| 652,325 | McKnight | June 26, 1900 |
| 1,031,165 | Biderman | July 2, 1912 |
| 1,053,051 | McIver | Feb. 11, 1913 |

FOREIGN PATENTS

| Number | Country | Date |
| --- | --- | --- |
| 7,208 | Great Britain | June 11, 1908 |
| 24,828 | Great Britain | Nov. 9, 1907 |
| 352,408 | Germany | Apr. 25, 1922 |
| 33,981 | Switzerland | May 9, 1905 |